United States Patent [19]
Berthold et al.

[11] Patent Number: 6,058,783
[45] Date of Patent: May 9, 2000

[54] SENSOR WITH IMPROVED CAPACITIVE TO VOLTAGE CONVERTER INTEGRATED CIRCUIT

[75] Inventors: James P. Berthold, North Attleboro; Keith W. Kawate, Attleboro Falls, both of Mass.

[73] Assignee: Texas Instruments Incorporated, Dallas, Tex.

[21] Appl. No.: 09/013,019

[22] Filed: Jan. 26, 1998

Related U.S. Application Data

[62] Division of application No. 08/840,744, Apr. 16, 1997, Pat. No. 5,770,802.

[51] Int. Cl.$^7$ ........................................................ G01L 9/12
[52] U.S. Cl. ............................................................. 73/766
[58] Field of Search ................................ 73/765, 724, 718, 73/1.57, 514.32, 862, 626, 766; 361/283.1–283.4

[56] References Cited

U.S. PATENT DOCUMENTS

| | | |
|---|---|---|
| 4,227,419 | 10/1980 | Park . |
| 4,398,426 | 8/1983 | Park et al. . |
| 4,982,351 | 1/1991 | Kawate et al. . |
| 5,241,850 | 9/1993 | Kawate . |
| 5,445,031 | 8/1995 | Benzel . |
| 5,534,773 | 7/1996 | Tsugai et al. ............................. 73/766 |
| 5,637,798 | 6/1997 | Schatz . |
| 5,909,132 | 6/1999 | Trofimenkoff et al. ................... 73/766 |

OTHER PUBLICATIONS

Publication: An Integrated Circuit for Capacitive Pressure Transducers; Mohammed Faheem Akram (Apr. 7–9, 1981).

*Primary Examiner*—Robert Raevis
*Attorney, Agent, or Firm*—Russell E. Baumann; Richard L. Donaldson

[57] ABSTRACT

A capacitive transducer (10) which provides an output voltage in response to the application of a mechanical stimulus such as pressure or acceleration includes a signal conditioning integrated circuit (12) to which are connected a variable capacitor ($C_{VAR}$), a reference capacitor ($C_{REF}$), a linear correction capacitor ($C_{LIN}$) as well as an integrating capacitor ($C_{INT}$) and associated filtering components. The linear correction capacitor ($C_{LIN}$) is used to offset a fixed parasitic charge associated with the variable capacitor. Any net error charge appearing on a detect, common node (pin 4) between the variable capacitor and the reference capacitor is cancelled out by means of an analog feedback network (22). In a modified embodiment a thermal compensation network (40) allows for correction for thermal error at a second temperature without having any affect at a first temperature.

2 Claims, 2 Drawing Sheets

SENSOR WITH IMPROVED CAPACITIVE TO VOLTAGE CONVERTER INTEGRATED CIRCUIT

This application is a division of application Ser. No. 08/840,744 filed on Apr. 16, 1997, now U.S. Pat. No. 5,770,802.

BACKGROUND OF THE INVENTION

This invention relates generally to sensors having variable capacitors as sensing elements and more particularly to signal conditioning electronics for providing an improved linear output voltage versus the application of a mechanical stimulus such as pressure or acceleration.

A signal conditioning circuit of this type is shown and described in U.S. Pat. No. 4,982,351, assigned to the assignee of the present invention, the disclosure of which is incorporated herein by this reference. In that patent, a condition responsive element such as a capacitive pressure transducer having a pressure responsive diaphragm for varying transducer capacitance within a selected range in response to variations in pressure forces applied to the diaphragm is shown connected to a reference capacitor in a charge locked loop relation having a common node for forming a capacitance to voltage converter circuit which is ratiometric with respect to supply voltage to vary output voltage within a selected range in response to variation in transducer capacitance in a corresponding range. An array of switches cycles the voltage across the transducer and reference capacitors with opposite transitions with a predetermined frequency so that change in transducer capacitance results in a differential voltage at the common node. That voltage is then amplified to drive a current source-sink network to adjust the sensor output voltage and, by a feedback path, to restore a balanced condition at the node, thereby to maintain the sensor output voltage as a function of the transducer capacitance.

The above circuit has been widely used with various capacitive transducers including pressure and acceleration responsive transducers and provides a nearly linear output voltage. Sensors of this type typically have a total accuracy within a few percent of full scale output voltage. As usage of such sensors increase, higher accuracy as well as lower cost are continuously sought after. Some error in the circuit is related to the feedback circuit which uses a flip-flop latch in which a specified voltage change, positive or negative, is applied to the variable capacitor to offset any error change in the common node. Using this digital approach allows minimization but not elimination of the error charge since it is limited by the incremental charge applied by the digital system. Additionally, a certain amount of non-linearity is found and evidences itself as a parasitic capacitor in parallel with the variable capacitor.

SUMMARY OF THE INVENTION

Although the above described signal conditioning electronic circuit is very effective and accurate within a small error band, it is an object of the present invention to provide a signal conditioning circuit which has even improved accuracy and improved linearity of its output voltage versus an applied mechanical stimulus. Another object is the provision of a condition responsive capacitive transducer having improved low cost, high accuracy signal conditioning electronics. Yet another object of the invention is the provision of a signal conditioning circuit which overcomes the above noted prior art limitations.

Briefly described, in accordance with the invention, a variable capacitor, whose capacitance varies in response to the application of a mechanical stimulus, is connected to a reference capacitor to form a common node which is coupled to a charge comparator which in turn is connected to a voltage to current stage. The output of the voltage to current stage is connected through a phase C switch, one of an array of switches controlled by a timing and logic circuit, to the positive input of an integrator buffer and to an integrating capacitor. The output of the integrator buffer is connected to an output amplifier and to an analog feedback network through a phase $\overline{B}$ switch connected to the variable capacitor. More specifically, at the commencement of an instruction cycle, the timing and logic circuit causes a phase A switch connected across the charge comparator, to open to thereby enable the charge capacitor. Following this event, phase $\overline{B}$ switches, which respectively connect the reference capacitor to a gain voltage and the variable capacitor to a bias voltage, are opened and then phase B switches which respectively connect the reference capacitor to the supply voltage and the variable capacitor to the analog feedback network, are closed thereby switching the voltages across the reference and variable capacitors and inducing a net charge at the common or detect node. At steady state conditions any net charge at this node represents an error charge. This error charge is converted to a voltage through the comparator and to a current at the voltage to current stage. After a short settling time period the phase C switch, connected to the output of the voltage to current stage, is closed so that the current is connected to an integrating capacitor and is converted back to a voltage on the output of the integrator buffer which is of opposite polarity to the net error charge on the detect node. This voltage is fed back to the variable capacitor to null out the error charge. The phase C switch is then opened and the other phase switches are caused to return to their previous state of energization in preparation for the next cycle.

According to a feature of the invention, a linear correction capacitor is connected to the common node and a signal generating means through phase B, $\overline{B}$ switches to provide a selected capacitance which is subtracted from the variable capacitance to compensate the parasitic capacitance.

According to a feature of a modified embodiment, compensation for capacitive sensor error over temperature is provided comprising a thermal compensation circuit utilizing a resistive bridge sensor network which is calibrated at a first temperature, such as room temperature, so that thermal compensation adjustment produces no sensor output change. Thermal compensation adjustments at a second temperature can then correct output error caused by temperature change without affecting the output at the first temperature.

DESCRIPTION OF THE DRAWINGS

Other objects, advantages and details of the novel and improved sensor with improved capacitor to voltage converter integrated circuit of the invention appears in the following detailed description of preferred embodiments of the invention, the detailed description referring to the drawings in which.

DESCRIPTION OF THE PREFERRED EMBODIMENTS

Figure 1:
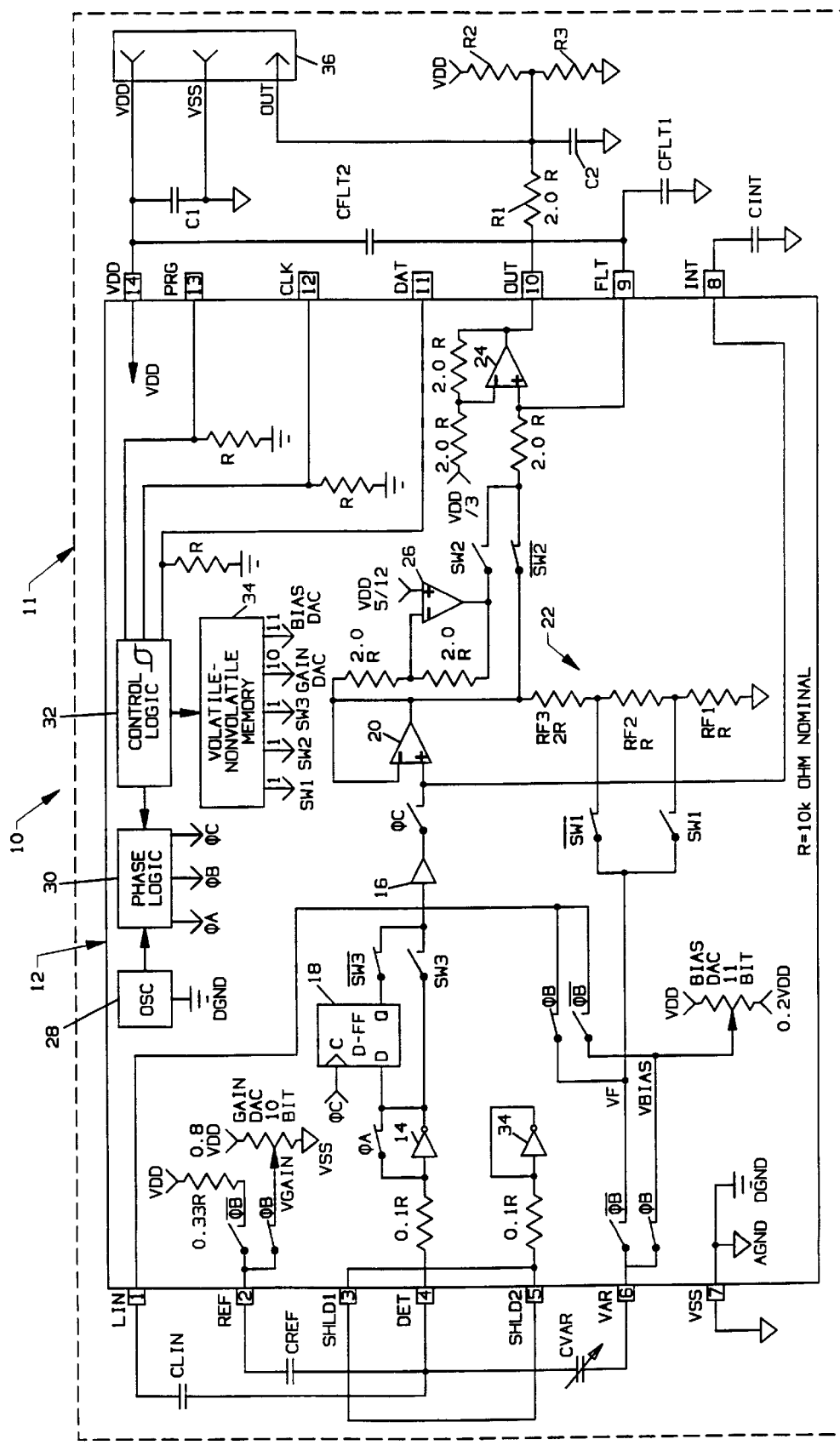
FIG. 1 is a block diagram of a sensor comprising a variable capacitor, integrated circuit and associated components of a first preferred embodiment of the invention.

Referring to FIG. 1, numeral 10 indicates the novel and improved sensor of the invention which is shown to include a condition or mechanical stimulus responsive means 11 such as an accelerometer, a pressure sensor, a position sensor or the like, which includes a variable capacitor $C_{VAR}$. Variable capacitor $C_{VAR}$, along with a reference capacitor $C_{REF}$, are connected to signal conditioning circuit means in the form of a calibrated capacitive conditioner integrated circuit 12. With regard to integrated circuit 12, for the purpose of the following description, the resistor value for R is 10K ohms nominal. More specifically, one side of the variable capacitor is connected to variable (VAR) pin 6 of circuit 12 and one side of reference capacitor $C_{REF}$ is connected to reference (REF) pin 2 of circuit 12. The other sides of the capacitors are connected to a detect (DET) pin 4. Internally of circuit 12, pin 4 is connected through a 0.1 R resistor to a charge comparator 14 with a phase switch ΦA connected across comparator 14. The output of comparator 14 is connected to a voltage to current stage 16 through a D-latch flip-flop 18 via a switch $\overline{SW3}$ or directly via switch SW3. Switches SW3, $\overline{SW3}$, along with SW1, $\overline{SW1}$ and SW2, $\overline{SW2}$ to be discussed below, are one time programmable switches. The output of the voltage to current stage 16 is connected through a phase switch ΦC to the integrator buffer 20 and to integrator (INT) pin 8 which in turn is connected to an external integrating capacitor $C_{INT}$. Buffer 20 output is connected to feedback network 22 comprising feedback resistors RF3, RF2, RF1 and switches $\overline{SW1}$, SW1 to pin VAR (pin 6) through a phase switch $\overline{\Phi B}$. Switch SW1 or $\overline{SW1}$ is programmed to be closed depending on the level of sensitivity desired.

Another programmable option is provided utilizing switches SW2, $\overline{SW2}$. In the default or normal operational, mode switch $\overline{SW2}$ is closed connecting the output of integrator buffer 20, through a 2.0 R resistor to the positive input of output amplifier 24 whose output is connected to (OUT) pin 10 and to (FLT) pin 9 which in turn is connected to an external filter capacitor $C_{FLT1}$. The negative input of output amplifier 24 is connected through a 2.0 R resistor to an attenuated supply voltage VDD/3 and through a 2.0 R resistor to the output of amplifier 24. This arrangement provides an output voltage which is related to capacitor $C_{VAR}$ as described infra. If desired, the change in output voltage can be inverted by programming switch SW2 to be closed instead of switch $\overline{SW2}$. In this arrangement the output of buffer 20 is connected through a 2.0 R resistor to the negative input of amplifier 26 whose positive input is connected to an attenuated supply voltage $V_{DD}$ 5/12. The output is also fed back to the negative input through a 2.0 R resistor.

Reference pin 2 is connected through a phase ΦB switch to a programmable voltage divider in the form of an 10 bit gain DAC between 0.8 $V_{DD}$ and $V_{SS}$ (where Vss is defined as 0 volts) and through a phase $\overline{\Phi B}$ switch to a reference voltage, i.e., through a 0.33 R resistor to supply voltage $V_{DD}$.

Variable pin 6 is connected though a phase ΦB switch to another programmable voltage in the form of an 11 bit bias DAC between $V_{DD}$ and 0.2 $V_{DD}$ and through a phase $\overline{\Phi B}$ switch to the feedback network as described above.

Figure 2:
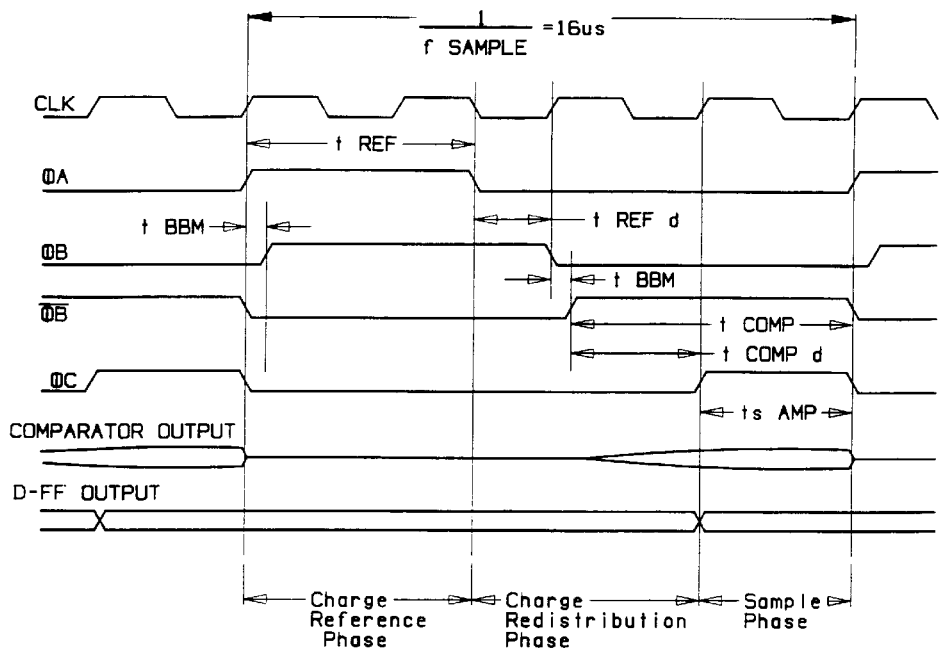
FIG. 2 is a timing diagram for the integrated circuit of FIG. 1.

Timing signals ΦA, ΦB, $\overline{\Phi B}$, ΦC are generated internally utilizing oscillator 28 and phase logic 30. In their high and low states, as shown in FIG. 2, these signals will close and open their respective switches. Switches SW1, $\overline{SW1}$, SW2, $\overline{SW2}$, SW3, $\overline{SW3}$ and the gain and bias DAC's are coupled to volatile—non-volatile memory 34. These functions are calibrated utilizing (DAT) pin 11, (CLK) pin 12 and (PGM) pin 13. Calibration consists of setting on-chip switches, testing circuit performance, iterating the first two steps and finally storing the final switch settings in a reliable, non-volatile memory.

A shield generator is connected to shield pins 3 and 5 and provides a voltage source equal to the threshold voltage present at the (DET) pin 4 during the charge reference phase (approximately $V_{DD}$/2) to be discussed. The shield voltage guards the conductor runs connected to pin 4 in a known manner.

Pin 7 (VSS) provides both an analog ground and digital ground while pin 14 (VDD) is for connection to a voltage source. Pin 14 is connected to terminal VDD of connector 36 with a filter capacitor C1 connected across terminals VDD and VSS. Terminal OUT of connector 36 is connected to pin 10 through resistor R1 of greater than 10 ohms, filter capacitor C2 and a voltage divider comprising a pull-up resistor R2 of greater than 1.8 K ohms and a pull-down resistor R3 of greater than 1.8 K ohms. Capacitor $C_{FLT2}$ is connected across (VDD) pin 14 and (FLT) pin 9.

According to a feature to be described, an external capacitor $C_{LIN}$ is connected externally to (LIN) pin 1 and internally through a phase ΦB switch to voltage VF of the feedback network and through a phase $\overline{\Phi B}$ switch to the voltage $V_{BIAS}$.

With the addition of the external components described, IC 12 converts small capacitance changes to large changes in output voltage. The input capacitance varies in response to the application of the mechanical stimulus, e.g., pressure, acceleration, and the like.

Operation of circuit 12 can be broken down into three phases. The first phase is a charge reference phase in which the phase logic of the phase switches is reflected in FIG. 1. During this phase a known quantity of charge is stored on the plates of reference capacitor $C_{REF}$ and transducer capacitor $C_{VAR}$. This is accomplished by closing the phase ΦA and ΦB switches which cause the known selected voltages $V_{DET}$–$V_{GAIN}$ to be impressed upon capacitor $C_{REF}$ and the voltage $V_{DET}$–$V_{BIAS}$ upon capacitor $C_{VAR}$. A known selected voltage $V_{DET}$–$V_F$ is also impressed upon capacitor $C_{LIN}$. The charge reference phase is selected to be long enough for capacitor $C_{REF}$ and $C_{VAR}$ voltages to settle before entering the next phase, the charge redistribution phase.

At the end of the first phase the phase ΦA switch opens, then the phase ΦB switch opens switching out the DAC voltages and the $\overline{\Phi B}$ switch then closes to switch in the supply voltage $V_{DD}$ and the feedback voltage $V_F$. This causes the output of the charge comparator to go to a logic one, a logic zero or somewhere in-between depending on the error voltage at common detect pin 4. The phase $\overline{\Phi B}$ switches are selected to be closed long enough to allow the comparator and the voltages across $C_{REF}$, $C_{VAR}$ to settle before entering the third sample phase.

During the third phase, according to a feature of the invention, switch SW3 is programmed during calibration to be closed (switch $\overline{SW3}$ open, the opposite modes being shown in FIG. 1). The charge comparator 14 output is sampled through phase switch ΦC and will then accordingly charge or discharge integrating capacitor $C_{INT}$. The voltage across comparator $C_{INT}$ is buffered by integrator buffer 20 and fed back to the input capacitor network through the resistor feedback network 22.

In the steady state, when capacitor $C_{VAR}$ is unchanging, the voltage of pin 4 does not change when switching between the reference phase and the charge redistribution or sample phase. The change in the charge on capacitor $C_{REF}$, $C_{VAR}$ and $C_{LIN}$, when switching from the reference phase to the comparator phase, can be calculated and the general form of a transfer function relating the output voltage to the change in the voltage of capacitor $C_{VAR}$ can be written $F_{OUT}=G*(F_{BIAS}-(1-F_{GAIN})*C_{REF}/(C_{VAR}-C_{LIN}))-\frac{1}{3}$ with switch $\overline{SW2}$ closed and where $F_{OUT}=V_{OUT}/V_{DD}$ and G is a known constant. A similar transfer function can be written with switch SW2 closed. The transfer function shows that the output voltage $V_{OUT}$ at terminal OUT is a linear function of mechanical stimulus if capacitance $C_{VAR}-C_{LIN}$ is inversely proportional to a linear function of mechanical stimulus (e.g., pressure, acceleration) however. However, capacitance $C_{VAR}$ inherently includes a parasitic capacitance $C_{PAR}$ which is independent of the mechanical stimulus and produces a non-linear output voltage. According to a feature of the invention, capacitor $C_{LIN}$ is used to neutralize the effect of this parasitic capacitance.

Although switch $\overline{SW3}$ in FIG. 1 is shown to be closed thereby connecting D-latch 18 in the circuit and providing a digital feedback loop, preferably switch SW3 is programmed to be closed with $\overline{SW3}$ open to bypass the D-latch. This results in an analog feedback loop which reduces noise by enabling the circuit to null out any error charge on the common node, pin 4. Use of D-latch 18 results in applying a specific positive or negative charge to capacitor $C_{VAR}$ so that some error charge inherently remains on the common node. That is, this type of feedback results in a predetermined small amount of sensor output noise. Although the integrating time constant in prior art circuit approaches utilizing a flip-flop, whether in a switch voltage approach described or in a switched current approach, can be increased in order to reduce this noise, the frequency response of the sensor is concomitantly degraded. By eliminating the flip-flop, i.e., D-latch 18, with a switch that allows an analog feedback, the net error charge can be cancelled by the provision of an equal feedback charge thereby significantly reducing noise. For example, in a sensor built in accordance with the invention, output noise of 1% fso (full scale output) was reduced to 0.1% fso without degrading the frequency response.

Figure 3:
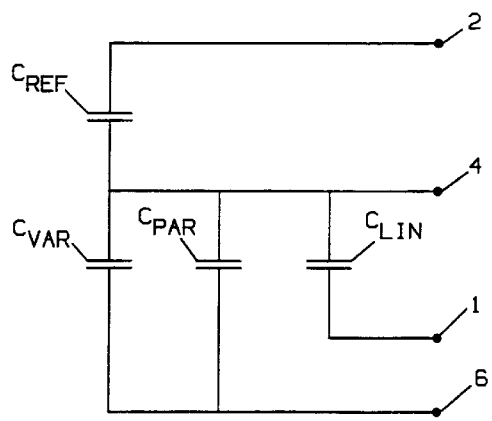
FIG. 3 is a simplified block diagram illustrating a linearity improvement feature of the invention.

As referenced above, another feature of the invention relates to the provision of means to correct for output non-linearity. Typically, non-linearity on the order of 1.0% fso occurs on pressure and acceleration sensors. This non-linearity is caused by various factors, such as the non-uniform movement of the movable capacitor plate on a diaphragm which is placed in communication with a pressure source wherein movement of the diaphragm decreases as one goes in a direction from the center out to the fixed perimeter of the diaphragm. This non-linearity can be modeled by adding a parasitic capacitor $C_{PAR}$ in parallel with the variable capacitor $C_{VAR}$ as shown in FIG. 3. The electronic transfer function for the switched voltage approach as described above results in a sensor output voltage that is a linear function of $C_{REF}/(C_{VAR}+C_{PAR}-CLIN)$. The inverse $C_{VAR}$ is ideally a linear function of the sensed stimulus therefore the sensor output voltage is also a linear function of the sensed stimulus as long as $C_{LIN}$ is equal to $C_{PAR}$. As shown in FIG. 3, one end of capacitor $C_{LIN}$ is connected to pin 4, the common node between capacitor $C_{REF}$ and $C_{VAR}$ while the other end is connected to a switch voltage signal that is opposite in phase to the signal applied to capacitors $C_{VAR}$. The amount of linearity correction can be adjusted by adjusting the capacitance of $C_{LIN}$ or by adjusting the magnitude of the signal applied to capacitor $C_{LIN}$.

A transducer made in accordance with the invention comprised the following components in addition to integrated circuit 12:

| | | | |
|---|---|---|---|
| $C_{VAR}$ | 20pF to 25pF | C1 | 0.1uF |
| $C_{REF}$ | 20pF | $C_{FLT2}$ | 0.1uF |
| $C_{LIN}$ | 2.0pF | $C_{FLT1}$ | 0.1uF |
| R1 | >10K ohm | $C_{LOAD}$ | 0.1uF |
| R2 | >1.8K ohm | $C_{INT}$ | 0.047uF |
| R3 | >1.8 ohm | | |

Figure 4:
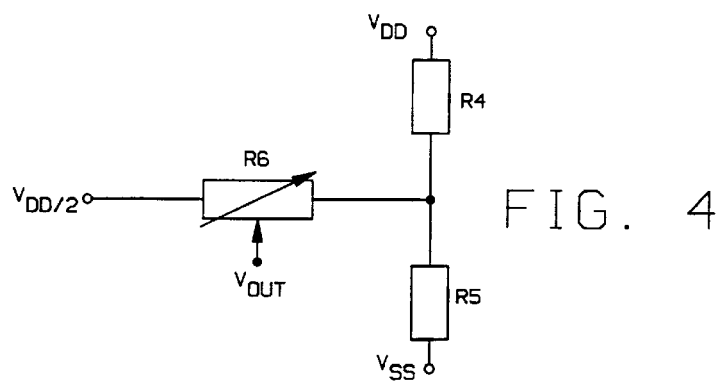
FIG. 4 is a simplified block diagram illustrating a thermal error compensation feature of a modified embodiment of the invention.

In a modified embodiment, a network feature shown in FIG. 4 provides thermal error compensation for the sensor. The network comprises a temperature dependent resistor R4 serially connected to a calibration resistor R5 between supply voltage $V_{DD}$ and ground $V_{SS}$. A thermal compensation potentiometer R6 is connected between a reference voltage $V_{DD}/2$ and the junction of resistors R4, R5. Calibration resistor R5 is adjusted such that adjustment of potentiometer R6 does not affect the offset compensation voltage connected to the sensor output stage at a first temperature, e.g., room temperature. Since the resistance value of resistor R4 changes with temperature, sensor output error caused by a change at a second temperature can be compensated by adjusting potentiometer R6 without affecting the sensor output at the first temperature. This embodiment simplifies thermal compensation by eliminating the need to make a second adjustment at the first temperature due to compensation at the second temperature. A further advantage is that with respect to the manufacturing process, the sensor data obtained in going from the first to the second temperatures and vice versa need not be remembered. A similar temperature compensation calibrating bridge is shown in coassigned U.S. Pat. No. 5,241,850, the subject matter of which is incorporated herein by this reference.

It should be understood that although particular embodiments of the invention have been described by way of illustrating the invention, other embodiments and variations of the invention are possible. Although the closed feedback loop is shown to extend to the variable capacitor, it will be understood that, if desired, a feedback loop could be provided for the reference capacitor. The invention includes all modifications and equivalents of the disclosed embodiments falling within the scope of the claims.

What is claimed:

1. A thermal compensation bridge network comprising a reference voltage, a temperature dependent resistor and a calibration resistor serially connected between a supply voltage and ground forming a junction therebetween providing an electrical output signal and a thermal compensation potentiometer connected between the reference voltage and the junction, the potentiometer having an output connected to the electrical output signal whereby adjustment of the calibration resistor can eliminate any affect of potentiometer setting upon the electrical output signal at a first temperature, and the potentiometer can be adjusted at a second temperature to provide compensation for offset error at the second temperature without affecting the electrical output signal at the first temperature.

2. A method for providing thermal offset error compensation in a device having a thermal compensation bridge network, a reference voltage, a temperature dependent resistor and a calibration resistor serially connected between a supply voltage and ground forming a junction therebetween providing an electrical output signal comprising the steps of connecting a thermal compensation potentiometer between the reference voltage and the junction with the potentiometer having an output connected to the electrical output signal, adjusting the calibration resistor to eliminate any affect of potentiometer setting upon the electrical output signal at a first temperature, and adjusting the potentiometer at a second temperature to provide compensation for offset error at the second temperature without affecting the electrical output signal at the first temperature.

* * * * *